United States Patent
Huang et al.

(10) Patent No.: US 10,978,898 B2
(45) Date of Patent: Apr. 13, 2021

(54) CHARGING CIRCUIT, SYSTEM AND METHOD, AND ELECTRONIC DEVICE

(71) Applicant: MEIZU TECHNOLOGY CO., LTD., Guangdong (CN)

(72) Inventors: Changsong Huang, Guangdong (CN); Linfeng Chen, Guangdong (CN); Xiaoyong Liu, Guangdong (CN)

(73) Assignee: MEIZU TECHNOLOGY CO., LTD.

( * ) Notice: Subject to any disclaimer, the term of this patent is extended or adjusted under 35 U.S.C. 154(b) by 186 days.

(21) Appl. No.: 16/321,837

(22) PCT Filed: Aug. 7, 2017

(86) PCT No.: PCT/CN2017/096200
§ 371 (c)(1),
(2) Date: Jan. 30, 2019

(87) PCT Pub. No.: WO2018/032990
PCT Pub. Date: Feb. 22, 2018

(65) Prior Publication Data
US 2019/0190281 A1   Jun. 20, 2019

(30) Foreign Application Priority Data

Aug. 15, 2016   (CN) .......................... 201610668958.7
Aug. 15, 2016   (CN) .......................... 201710081785.3

(51) Int. Cl.
*H02J 7/00* (2006.01)
*H02M 3/07* (2006.01)
*H02J 7/34* (2006.01)

(52) U.S. Cl.
CPC ................ *H02J 7/008* (2013.01); *H02J 7/00* (2013.01); *H02M 3/07* (2013.01); *H02J 7/345* (2013.01)

(58) Field of Classification Search
CPC ......... Y02E 60/12; H02J 7/0068; H02J 7/022; H02J 7/0073; H01M 10/44
See application file for complete search history.

(56) References Cited

U.S. PATENT DOCUMENTS 6,960,955 B2 * 11/2005 Nonaka .................. H02M 3/07
327/536
8,854,019 B1 * 10/2014 Levesque ................ H02M 3/07
323/266

(Continued)

FOREIGN PATENT DOCUMENTS

CN   101043177   9/2007
CN   102082505   6/2011

(Continued)

OTHER PUBLICATIONS

European Search Report for EP Application No. 17840965.2 dated Nov. 29, 2019.

(Continued)

*Primary Examiner* — Arun C Williams
(74) *Attorney, Agent, or Firm* — The Belles Group, P.C.

(57) ABSTRACT

A charging circuit, a charging system, a charging method, and an electronic device is provided. In the charging circuit, a control signal transmitted by a controller is received, and then it is determined whether the control signal is a first control signal. If it is determined that the control signal is the first control signal, a first set of switches is turned on and a second set of switches is turned off to cause an adaptation module to charge a first capacitor, a second capacitor and a battery. If it is determined that the control signal is not the first control signal, the second set of switches is turned on and the first set of switches is turned off to cause the first capacitor and the second capacitor to charge the battery.

15 Claims, 4 Drawing Sheets

(56) References Cited

U.S. PATENT DOCUMENTS

| | | | |
|---|---|---|---|
| 2002/0051372 A1* | 5/2002 | Hoshino | H02M 3/07 363/60 |
| 2002/0130705 A1* | 9/2002 | Meng | H02M 3/07 327/536 |
| 2002/0163376 A1* | 11/2002 | Pappalardo | H02M 3/07 327/536 |
| 2003/0011420 A1* | 1/2003 | Kawai | H02M 3/07 327/536 |
| 2003/0038612 A1* | 2/2003 | Kutkut | H02M 3/33561 320/140 |
| 2006/0012585 A1* | 1/2006 | Schoofs | G09G 3/3696 345/204 |
| 2006/0114053 A1* | 6/2006 | Sohara | H02M 3/07 327/536 |
| 2007/0200615 A1 | 8/2007 | Eklund et al. | |
| 2008/0123417 A1* | 5/2008 | Byeon | G11C 8/10 365/185.05 |
| 2009/0066407 A1* | 3/2009 | Bowman | H02M 3/07 327/536 |
| 2011/0204961 A1* | 8/2011 | Galal | H02M 3/07 327/536 |
| 2011/0254514 A1* | 10/2011 | Fleming | H02M 3/07 320/166 |
| 2013/0063118 A1* | 3/2013 | Nguyen | G11C 5/145 323/304 |
| 2014/0167509 A1 | 6/2014 | Fernald | |
| 2015/0028803 A1 | 1/2015 | Shevde et al. | |
| 2015/0091637 A1* | 4/2015 | Pan | H02M 3/07 327/536 |
| 2016/0204695 A1 | 7/2016 | Peng et al. | |
| 2018/0083459 A1* | 3/2018 | Huang | H02J 7/0077 |

FOREIGN PATENT DOCUMENTS

| | | |
|---|---|---|
| CN | 204886693 | 12/2015 |
| CN | 105703423 | 6/2016 |
| CN | 106230051 | 12/2016 |
| CN | 106849645 | 6/2017 |

OTHER PUBLICATIONS

International Search Report for Corresponding Application No. PCT/CN2017/096200 dated Nov. 10, 2017. WO.

* cited by examiner

1

CHARGING CIRCUIT, SYSTEM AND METHOD, AND ELECTRONIC DEVICE

CROSS-REFERENCE TO RELATED PATENT APPLICATIONS

This application is the national phase of PCT International Patent Application PCT/CN2017/096200, filed on Aug. 7, 2017, which claims priorities to Chinese Patent Application No. 201610668958.7, titled "CHARGING CIRCUIT, SYSTEM AND METHOD, AND ELECTRONIC DEVICE", filed on Aug. 15, 2016 with the Chinese Patent Office, and Chinese Patent Application No. 201710081785.3, titled "CHARGING CIRCUIT AND METHOD, AND ELECTRONIC DEVICE", filed on Aug. 15, 2016 with the Chinese Patent Office, all of which are incorporated herein by reference in their entireties.

This application claims priorities to Chinese Patent Application No. 201610668958.7, titled "CHARGING CIRCUIT, SYSTEM AND METHOD, AND ELECTRONIC DEVICE", filed on Aug. 15, 2016 with the Chinese Patent Office, and Chinese Patent Application No. 201710081785.3, titled "CHARGING CIRCUIT AND METHOD, AND ELECTRONIC DEVICE", filed on Aug. 15, 2016 with the Chinese Patent Office, both of which are incorporated herein by reference in their entireties.

FIELD

The present disclosure relates to the technical field of charging, and in particular to a charging circuit, a charging system, a charging method, and an electronic device.

BACKGROUND

With the increasing development of terminal devices, the terminal device has a high demand for power and consumes the power fast. In this case, the frequency for charging the terminal device becomes more and more high, which greatly affects the charging efficiency of the terminal device and reduces the user experience. Currently, a charging circuit based on a Buck circuit is commonly used to charge the terminal device at a large current.

The Buck circuit includes an output inductor having winding loss and magnetic core loss, which may result in low step-down conversion efficiency (which is generally equal to or less than 91%) of the charging circuit. In this case, the charging is not performed at a large current (that is, the charging current is small), the charging speed of the charging circuit is small, the charging time of the charging circuit is long, and the charging efficiency of the charging circuit is low. Further, the lost energy of the output inductor is generally converted into thermal energy, which causes large heating generation of the charging circuit.

That is, problems such as low step-down conversion efficiency, a small charging current and large heating generation exist in the conventional charging circuits.

SUMMARY

There are provided a charging circuit, a charging system, a charging method, and an electronic device according to embodiments of the present disclosure, to solve problems such as low step-down conversion efficiency and large heating generation existing in the conventional charging circuits.

In a first aspect, a charging circuit is provided according to an embodiment of the present disclosure. The charging circuit includes: a control module and a charge pump conversion module connected to the control module. An input end of the charge pump conversion module is connected to an adaptation module, and an output end of the charge pump conversion module is connected to a battery module. The charge pump conversion module includes one or more charge pump conversion submodules connected in parallel with each other. For each of the charge pump conversion submodules in the charge pump conversion module, the charge pump conversion submodule is configured to: turn on a first set of switches in the charge pump conversion submodule and turn off a second set of switches in the charge pump conversion submodule to cause the adaptation module to charge the battery module and capacitors in the charge pump conversion submodule, in a case that the charge pump conversion submodule receives a first control signal transmitted by the control module; or turn off the first set of switches in the charge pump conversion submodule and turn on the second set of switches in the charge pump conversion submodule to cause the capacitors in the charge pump conversion submodule to charge the battery module, in a case that the charge pump conversion submodule receives a second control signal transmitted by the control module.

In combination with the first aspect, in a first possible implementation of the first aspect, the first set of switches includes a first switch and a second switch, the second set of switches includes a third switch and a fourth switch, and the capacitors include a first capacitor and a second capacitor. A control terminal of the first switch is connected to an output end of the control module, an input terminal of the first switch is connected to a first terminal of the adaptation module, and an output terminal of the first switch is connected to an input terminal of the third switch and a first terminal of the first capacitor. A control terminal of the second switch is connected to the output end of the control module, an input terminal of the second switch is connected to a second terminal of the first capacitor and an input terminal of the fourth switch, and an output terminal of the second switch is connected to a first terminal of the second capacitor, a first terminal of the battery module, and an output terminal of the third switch. A control terminal of the third switch is connected to the output end of the control module. A control terminal of the fourth switch is connected to the output end of the control module, and an output terminal of the fourth switch is connected to a second terminal of the second capacitor, a second terminal of the adaptation module, and a second terminal of the battery module and serves as a common negative terminal.

In conjunction with the first possible implementation of the first aspect, in a second possible implementation of the first aspect, each of the first switch, the second switch, the third switch and the fourth switch at least includes one or more switching elements connected in parallel with each other.

In combination with the second possible implementation of the first aspect, in a third possible implementation of the first aspect, each of the one or more switching elements connected in parallel with each other is a transistor.

In combination with the second possible implementation of the first aspect, in a fourth possible implementation of the first aspect, each of the first capacitor and the second capacitor at least includes one or more capacitive elements connected in parallel with each other.

In combination with the second to fourth possible implementations of the first aspect, in a fifth possible implementation of the first aspect, the charging circuit further includes a compensation module connected to the adaptation module and the charge pump conversion module. The compensation module is configured to: perform, for each of the charge pump conversion submodules, current compensation on the battery module and the capacitors in the charge pump conversion submodule in a case that the first set of switches in the charge pump conversion submodule is turned on and the second set of switches in the charge pump conversion submodule is turned off.

In combination with the fifth possible implementation of the first aspect, in a sixth possible implementation of the first aspect, the compensation module includes a third capacitor. A first terminal of the third capacitor is connected to the first terminal of the adaptation module and the input terminal of the first switch, and a second terminal of the third capacitor is connected to the second terminal of the second capacitor, the second terminal of the battery module, the second terminal of the adaptation module, and the output terminal of the fourth switch.

In combination with the second to fourth possible implementations of the first aspect, in a seventh possible implementation of the first aspect, the charging circuit further includes a feedback unit connected between the battery module and the adaptation module. The feedback unit is configured to: acquire power information of the battery module in a real time manner, and generate charging information based on the power information; and feed back the charging information to the adaptation module, where the adaptation module changes, based on the charging information, a voltage and a current outputted to the charge pump conversion module in a real time manner.

In combination with the first aspect, in an eighth possible implementation of the first aspect, for each of the charge pump conversion submodules in the charge pump conversion module, a relationship between an input voltage of the charge pump conversion submodule, an input current of the charge pump conversion submodule, a charging voltage required by the battery module and a charging current required by the battery module is expressed by a first formula:

$$\begin{cases} Vc = 2*Vbat/\eta \\ Ic = Ibat/(2*M) \end{cases}$$

where Vc represents the input voltage of the charge pump conversion submodule, Ic represents the input current of the charge pump conversion submodule, Vbat represents the charging voltage required by the battery module, Ibat represents the charging current required by the battery module, $\eta$ represents a step-down conversion efficiency of the charging circuit, and M is a positive integer and represents the number of the charge pump conversion submodules in the charge pump conversion module.

In a second aspect, a charging system is provided according to an embodiment of the present disclosure, which includes the charging circuit described in the first aspect of embodiments of the present disclosure.

In a third aspect, a charging method is provided according to an embodiment of the present disclosure. The method includes:

receiving a control signal transmitted by a controller; and turning on a first set of switches in a charge pump conversion submodule and turning off a second set of switches in the charge pump conversion submodule to cause a power supply adapter to charge a first capacitor and a second capacitor in the charge pump conversion submodule and a battery connected to the charge pump conversion submodule, if it is determined that the control signal is a first control signal; or turning on the second set of switches in the charge pump conversion submodule and turning off the first set of switches in the charge pump conversion submodule to cause the first capacitor and the second capacitor to charge the battery, if it is determined that the control signal is a second control signal, where the charge pump conversion submodule is a charge pump conversion submodule in a charge pump conversion module, and the charge pump conversion module includes one or more charge pump conversion submodules connected in parallel with each other.

In combination with the third aspect, in a first possible implementation of the third aspect, the method further includes performing current compensation on the first capacitor, the second capacitor and the battery by using a third capacitor connected in parallel with the power supply adapter in a case that the first set of switches is turned on and the second set of switches is turned off.

In combination with the third aspect, in a second possible implementation of the third aspect, the method further includes: determining a charging voltage and a charging current of the battery; and determining, based on the charging voltage and the charging current of the battery, an output voltage and an output current outputted by the power supply adapter to the charge pump conversion module.

In combination with the third aspect, in a third possible implementation of the third aspect, the method further includes: acquiring power information of the battery in a real time manner and generating charging information based on the power information; and feeding back the charging information to the power supply adapter, and changing, by the power supply adapter based on the charging information, a voltage and a current outputted to the charge pump conversion module in a real time manner.

In a fourth aspect, an electronic device is provided according to an embodiment of the present disclosure. The electronic device includes a receiving unit and a charging unit. The receiving unit is configured to receive a control signal transmitted by a controller to a charge pump conversion submodule in a charge pump conversion module. The charging unit is configured to: turn on a first set of switches in the charge pump conversion submodule and turn off a second set of switches in the charge pump conversion submodule to cause a power supply adapter to charge a first capacitor and a second capacitor in the charge pump conversion submodule and a battery connected to the charge pump conversion submodule, if it is determined that the control signal is a first control signal; or turn on the second set of switches in the charge pump conversion submodule and turn off the first set of switches in the charge pump conversion submodule to cause the first capacitor and the second capacitor to charge the battery, if it is determined that the control signal is a second control signal. The charge pump conversion module includes one or more charge pump conversion submodules connected in parallel with each other.

In combination with the fourth aspect, in a first possible implementation of the fourth aspect, the device further includes a compensation unit. The compensation unit is configured to: perform current compensation on the first capacitor, the second capacitor and the battery by using a third capacitor connected in parallel with the power supply adapter in a case that the first set of switches is turned on and the second set of switches is turned off.

In combination with the fourth aspect, in a second possible implementation of the fourth aspect, the device further includes a feedback unit. The feedback unit is configured to: acquire power information of the battery in a real time manner and generate charging information based on the power information; and feed back the charging information to the power supply adapter, where the power supply adapter changes, based on the charging information, a voltage and a current outputted to the charge pump conversion module in a real time manner.

With the charging circuit, the charging system, the charging method and the electronic device provided in the first aspect to the fourth aspect, the charging circuit includes a charge pump conversion module including one or more charge pump conversion submodules connected in parallel with each other. For each of the charge pump conversion submodules, in the case that the charge pump conversion submodule receives the first control signal transmitted by the control module, the first set of switches is turned on and the second set of switches is turned off, so that the adaptation module charges the capacitors in the charge pump conversion submodule and the battery module connected with all of the charge pump conversion submodules. Further, in the case that the charge pump conversion submodule receives the second control signal transmitted by the control module, the second set of switches is turned on and the first set of switches is turned off, so that the capacitors in the charge pump conversion submodule charges the battery module. Compared with the conventional technology, charge and discharge elements used in the charging circuit according to the embodiment of the present disclosure are provided as capacitors rather than inductors, avoiding the problems such as the low step-down conversion efficiency, the small charging current and the large heating generation due to the inductors in the charging circuit. Furthermore, the charge pump conversion module has functions of stepping down a voltage and stepping up a current, so that a large current may be outputted in the case of a small input current. That is, the charging can be performed at a large current, so that a charging speed of the charging circuit can be effectively increased, and charging time of the charging circuit can be reduced, thereby improving charging efficiency of the charging circuit and avoiding the heating generation during the charging of the terminal device, and thus improving user experience.

BRIEF DESCRIPTION OF THE DRAWINGS

In order to more clearly illustrate technical solutions in embodiments of the present disclosure, the drawings to be used in the description of the embodiments are briefly described hereinafter. Apparently, the drawings in the following description show only some embodiments of the present disclosure, and other drawings may be obtained by those skilled in the art from the drawings without any creative work.

DETAILED DESCRIPTION OF EMBODIMENTS

In order to make objects, technical solutions and advantages of the present disclosure clearer, the present disclosure is further described in detail with reference to the drawings hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

First Embodiment

Figure 1:
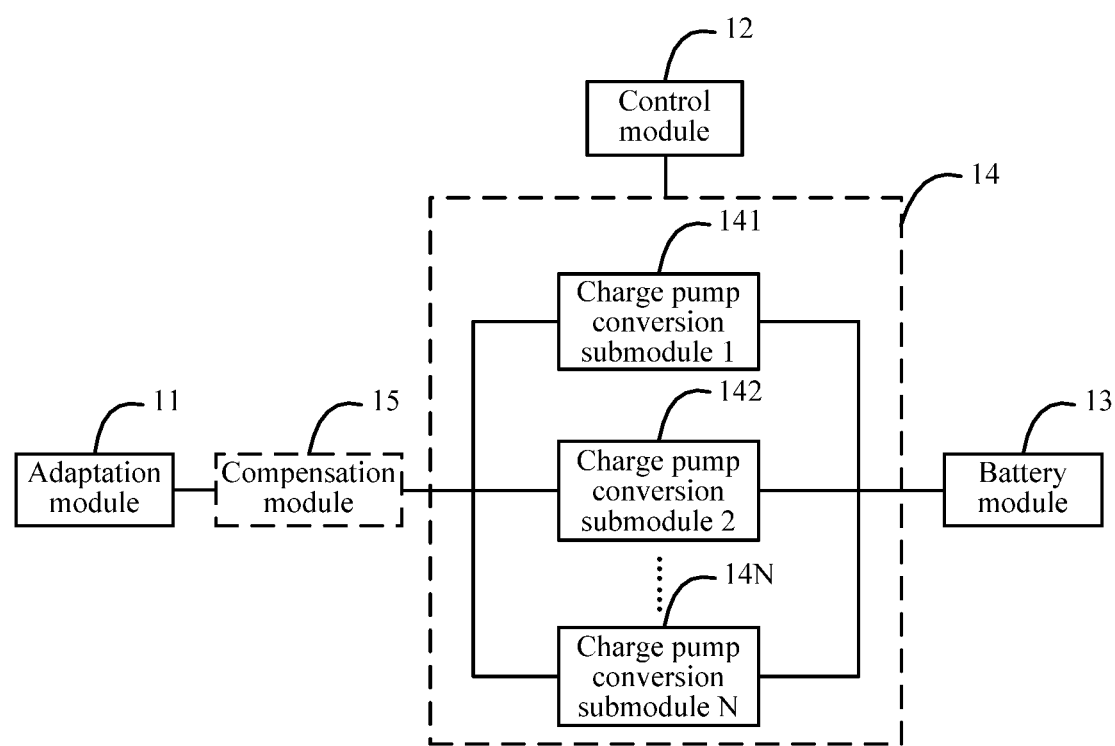
FIG. 1 is a schematic structural diagram of a charging circuit according to a first embodiment of the present disclosure.

In order to solve problems of a conventional charging circuit such as low step-down conversion efficiency, a small charging current and large heat generation, a charging circuit is provided according to a first embodiment of the present disclosure. Reference is made to FIG. 1, which is a schematic structural diagram of the charging circuit according to the first embodiment of the present disclosure. It should be noted that the charging circuit may be applied in a charging scenario having a terminal device. Specifically, as shown in FIG. 1, the charging circuit may include an adaptation module 11, a control module 12, and a battery module 13. The charging circuit may further include a charge pump conversion module 14 connected to the adaptation module 11, the control module 12 and the battery module 13. The charge pump conversion module 14 may include one or more charge pump conversion submodules connected in parallel with each other (the charge pump conversion module including N charge pump conversion submodules is shown in FIG. 1 as an example, where N is a positive integer).

For each (i.e., 141, 142, . . . 14N shown in FIG. 1) of the charge pump conversion submodules in the charge pump conversion module 14, the charge pump conversion submodule is configured to: turn on a first set of switches in the charge pump conversion submodule and turn off a second set of switches in the charge pump conversion submodule to cause the adaptation module 11 to charge the battery module 13 and capacitors in the charge pump conversion submodule, in a case that the charge pump conversion submodule receives a first control signal transmitted by the control module 12; or turn off the first set of switches in the charge pump conversion submodule and turn on the second set of switches in the charge pump conversion submodule to cause the capacitors in the charge pump conversion submodule to charge the battery module 13, in a case that the charge pump conversion submodule receives a second control signal transmitted by the control module 12.

It should be noted that the number of charge pump conversion submodules included in the charge pump conversion module 14 may be flexibly set according to actual situations in the embodiment of the present disclosure. For example, the number of the charge pump conversion submodules may be set as 2, 5 or 10, which is not limited herein. Preferably, the charge pump conversion module 14 generally includes at least two charge pump conversion submodules (connected in parallel with each other), which is not repeated herein.

Further, the first control signal and the second signal may be flexibly provided according to needs. For example, the first control signal may be provided as a high level 1, and the second signal may be provided as a low level 0. Alternatively, the first control signal may be provided as a low level 0, and the second signal may be provided as a high level 1, which is not limited herein.

It should further be noted that the control module 12 may transmit the first control signal and the second control signal by software, for example, by writing a software program. In this case, the first control signal and the second control signal are transmitted by executing the software program. The control module 12 may also transmit the first control signal and the second control signal by hardware, for example, by using a specific hardware chip. The control module 12 may transmit the first control signal and the second control signal at a certain period (which may be flexibly set according to actual situations). For example, the control module 12 transmits the first control signal in a first phase (in a former half T/2) of a period (which may be indicated by T), and transmits the second control signal in a second phase (in a later half T/2) of the period, which is not limited in the embodiment of the present disclosure.

That is, in the embodiment of the present disclosure, for each of the charge pump conversion submodules, in the case that the charge pump conversion submodule receives the first control signal transmitted by the control module, the first set of switches is turned on and the second set of switches is turned off, so that the adaptation module charges the capacitors in the charge pump conversion submodule and the battery module connected with all of the charge pump conversion submodules. Further, in the case that the charge pump conversion submodule receives the second control signal transmitted by the control module, the second set of switches is turned on and the first set of switches is turned off, so that the capacitors in the charge pump conversion submodule charges the battery module. Compared with the conventional technology, charge and discharge elements used in the charging circuit according to the embodiment of the present disclosure are provided as capacitors rather than inductors, leading to no winding loss, magnetic core loss, and heating generation, which are generally caused by inductors in the charging circuit, and solving problems in the conventional technology such as the low step-down conversion efficiency, the small charging current and the large heating generation existing in the conventional charging circuit. Furthermore, the charge pump conversion module has functions of stepping down a voltage and stepping up a current, so that a large current may be outputted in the case of a small input current. That is, the charging can be performed at a large current, so that a charging speed of the charging circuit can be effectively increased, and charging time of the charging circuit can be reduced, thereby improving the charging efficiency of the charging circuit and avoiding the heating generation during the charging of the terminal device, and thus improving user experience.

Figure 2:
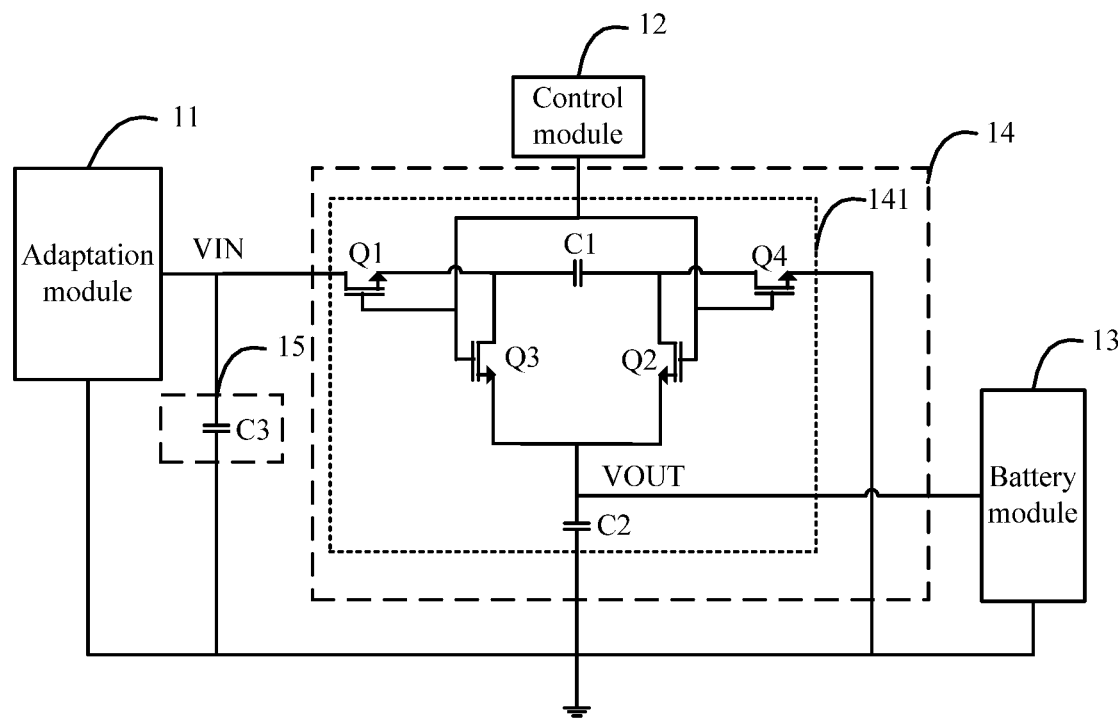
FIG. 2 is a schematic diagram showing a specific structure of the charging circuit according to the first embodiment of the present disclosure.

Specifically, as shown in FIG. 2, in which the charge pump conversion module including only one charge pump conversion submodule is shown as an example, the first set of switches may include a first switch (Q1 shown in FIG. 2) and a second switch (Q2 shown in FIG. 2), the second set of switches may include a third switch (Q3 shown in FIG. 2) and a fourth switch (Q4 shown in FIG. 2), and the capacitors may include a first capacitor (C1 shown in FIG. 2) and a second capacitor (C2 shown in FIG. 2).

A control terminal of the first switch (Q1 shown in FIG. 2) is connected to an output end of the control module 12, an input terminal of the first switch is connected to a first terminal of the adaptation module 11, and an output terminal of the first switch is connected to an input terminal of the third switch (Q3 shown in FIG. 2) and a first terminal of the first capacitor (C1 shown in FIG. 2).

A control terminal of the second switch (Q2 shown in FIG. 2) is connected to the output end of the control module 12, an input terminal of the second switch is connected to a second terminal of the first capacitor (C1 shown in FIG. 2) and an input terminal of the fourth switch (Q4 shown in FIG. 2), and an output terminal of the second switch is connected to a first terminal of the second capacitor (C2 shown in FIG. 2), a first terminal of the battery module 13, and an output terminal of the third switch (Q3 shown in FIG. 2).

A control terminal of the third switch (Q3 shown in FIG. 2) is connected to the output end of the control module 12.

A control terminal of the fourth switch (Q4 shown in FIG. 2) is connected to the output end of the control module 12, and an output terminal of the fourth switch is connected to a second terminal of the second capacitor (C2 shown in FIG. 2), a second terminal of the adaptation module 11, and a second terminal of the battery module 13.

It can be seen from the above that, in the embodiment of the present disclosure, for each of the charge pump conversion submodules, in the case that the charge pump conversion submodule receives the first control signal transmitted by the control module 12, the first set of switches in the charge pump conversion submodule is turned on and the second set of switches in the charge pump conversion submodule is turned off, so that the adaptation module 11 charges the battery module 13 and the first capacitor and the second capacitor in the charge pump conversion submodule. It should be noted that, in this case the battery module 13 is charged by the second capacitor in the charge pump conversion submodule. Further, in the case that the charge pump conversion submodule receives the second control signal transmitted by the control module 12, the second set of switches in the charge pump conversion submodule is turned on and the first set of switches in the charge pump conversion submodule is turned off, so that the first capacitor and the second capacitor in the charge pump conversion submodule charges the battery module 13. Compared with the conventional technology, charge and discharge elements used in the charging circuit according to the embodiment of the present disclosure are provided as capacitors (i.e., the first capacitor and the second capacitor) rather than inductors, leading to no winding loss, magnetic core loss, and heating generation. Furthermore, the charge pump conversion module has functions of stepping down a voltage and stepping up a current, so that a large current may be outputted in the case of a small input current. That is, the charging can be performed at a large current, so that the charging speed of the charging circuit can be effectively increased, and the charging time of the charging circuit can be reduced, thereby improving the charging efficiency of the charging circuit while avoiding the heating generation during the charging of the terminal device, and thus improving the user experience, which are not repeated herein.

It should be noted that in the embodiment of the present disclosure, a circuit formed by the first switch (Q1 shown in FIG. 2), the second switch (Q2 shown in FIG. 2), the third switch (Q3 shown in FIG. 2), the fourth switch (Q4 shown in FIG. 2), the first capacitor (C1 shown in FIG. 2) and the second capacitor (C2 shown in FIG. 2) may be referred to as a charge pump converter circuit. Therefore, in the embodiment of the present disclosure, the charging circuit may also be referred to as a charging circuit (which is still referred to as the charging circuit for short hereinafter) based on the charge pump converter circuit, which is not described in detail herein.

Further, each of the first switch (Q1 shown in FIG. 2), the second switch (Q2 shown in FIG. 2), the third switch (Q3 shown in FIG. 2), and the fourth switch (Q4 shown in FIG. 2) at least may include one or more switching elements connected in parallel with each other. In this way, conduction resistance of the switching elements can be effectively reduced, and the current in the charging circuit can be increased, so that the charging speed of the charging circuit is increased, and the charging time of the charging circuit is reduced, thereby improving the charging efficiency of the charging circuit, which is not repeated in the embodiment of the present disclosure.

Preferably, each of the one or more switching elements connected in parallel with each other is a transistor.

Optionally, the transistor may be a triode transistor or a field effect transistor.

It should be noted that, in a case that the switch is a triode transistor, a control terminal of the switch is a base of the triode transistor, an input terminal of the switch is a collector (or an emitter) of the triode transistor, and an output terminal of the switch is an emitter (or a collector) of the triode transistor. In a case that the switch is a field effect transistor, the control terminal of the switch is a gate of the field effect transistor, the input terminal of the switch is a drain (or a source) of the field effect transistor, and the output terminal of the switch is a source (or a drain) of the field effect transistor. The input terminal and the output terminal of the switch may be exchanged for each other, which is not limited in the embodiment of the present disclosure.

Optionally, the triode transistor may be an NPN triode transistor or a PNP triode transistor, and the field effect transistor may be an N-channel filed effect transistor or a P-channel filed effect transistor, which are not limited in the embodiment of the present disclosure.

In addition, it should be noted that each of the first switch, the second switch, the third switch and the fourth switch may be any one switching element having a switching function, such as a single-pole double-throw switch, which is not limited in the embodiment of the present disclosure.

It should be noted that each of the first capacitor (C1 shown in FIG. 2) and the second capacitor (C2 shown in FIG. 2) at least includes one or more capacitive elements connected in parallel with each other. With the capacitive elements connected in parallel with each other, equivalent series resistance (ESR) of the first capacitor and the second capacitor can be effectively reduced, and the current in the charging circuit can be effectively increased, so that the charging speed of the charging circuit is increased, and the charging time of the charging circuit is reduced, thereby improving the charging efficiency of the charging circuit, which is not repeated in the embodiment of the present disclosure.

Figure 3:
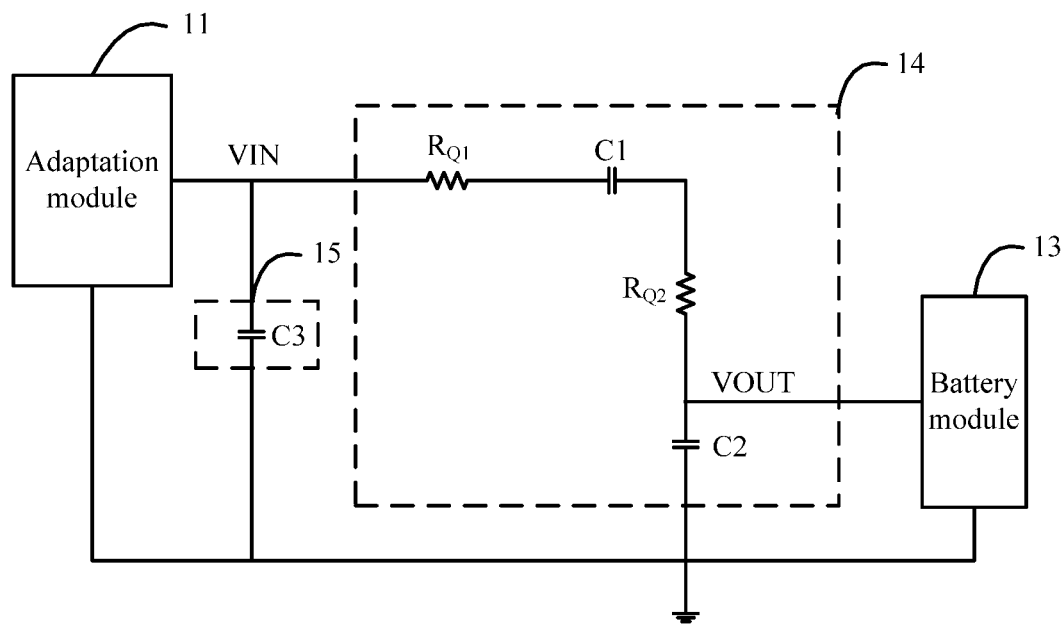
FIG. 3 shows an equivalent circuit of the charging circuit according to the first embodiment of the present disclosure in a first phase.

Further, as shown in FIGS. 2 and 3, the charging circuit may further include a compensation module 15 connected to the adaptation module 11 and the charge pump conversion module 14.

The compensation module 15 is configured to: perform, for each of the charge pump conversion submodules, current compensation on the battery module 13 and the capacitors (C1 and C2 shown in FIG. 2) in the charge pump conversion submodule in a case that the first set of switches in the charge pump conversion submodule is turned on and the second set of switches in the charge pump conversion submodule is turned off.

Optionally, the compensation module 15 may include a third capacitor (C3 shown in FIG. 2).

A first terminal of the third capacitor (C3 shown in FIG. 2) is connected to the output end of the adaptation module 11 and the input terminal of the first switch (Q1 shown in FIG. 2), and a second terminal of the third capacitor is connected to the second terminal of the second capacitor (C2 shown in FIG. 2), the second terminal of the battery module 13, and the output terminal of the fourth switch (Q4 shown in FIG. 2).

It should be noted that, in order to further reduce ESR of the third capacitor (C3 shown in FIG. 2), reduce the charging time and improve the charging efficiency, the third capacitor at least may include one or more capacitive elements connected in parallel with each other, which is not described in detail herein.

That is, in the embodiment of the present disclosure, a third capacitor may be connected in parallel to the input end of the charge pump conversion module 14, which is similar to that in the conventional technology. Since the third capacitor is also connected in parallel with the adaptation module 11, the adaptation module 11 always charges the third capacitor, so that the third capacitor can charge the first capacitor C1, the second capacitor C2, and the battery module 13 in a case that the first switch Q1 and the second switch Q2 are turned on, thereby achieving the current compensation, and avoiding the slow charging speed and the long charging time due to a small current outputted by the adaptation module 11.

Further, for each of the charge pump conversion submodules in the charge pump conversion module 14, a relationship between an input voltage of the charge pump conversion submodule, an input current of the charge pump conversion submodule, a charging voltage required by the battery module 13, and a charging current required by the battery module 13 is expressed by a first formula (i.e., a formula (1)):

$$\begin{cases} Vc = 2 * Vbat/\eta \\ Ic = Ibat/(2*M) \end{cases} \quad (1)$$

where Vc represents the input voltage of the charge pump conversion submodule, Ic represents the input current of the charge pump conversion submodule, Vbat represents the charging voltage required by the battery module 13, Ibat represents the charging current required by the battery module 13, $\eta$ represents a step-down conversion efficiency of the charging circuit, and M is a positive integer and represents the number of the charge pump conversion submodules in the charge pump conversion module.

Figure 4:
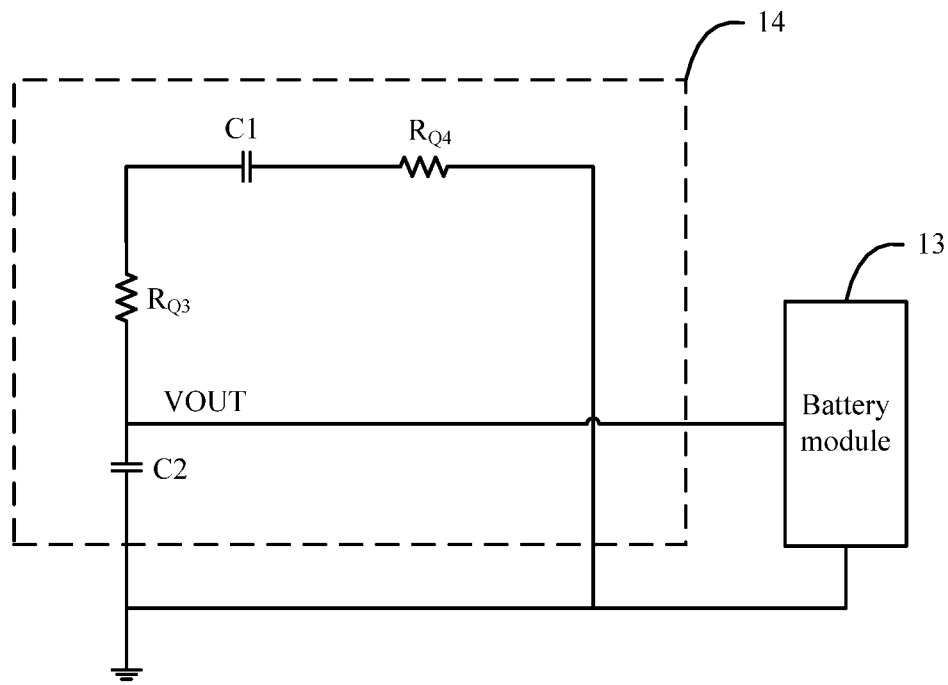
FIG. 4 shows an equivalent circuit of the charging circuit according to the first embodiment of the present disclosure in a second phase.

Taking the charge pump conversion module 14 including only one charge pump conversion submodule as an example, it is assumed that each of the first switch Q1, the second switch Q2, the third switch Q3 and the fourth switch Q4 is an MOS transistor, and the conduction resistance of the first switch, the second switch, the third switch and the fourth switch are respectively indicated by $R_{Q1}$, $R_{Q2}$, $R_{Q3}$ and $R_{Q4}$, and the ESR of the first capacitor C1 and the second capacitor C2 are respectively indicated by $R_{C1}$ and $R_{C2}$. In a case that the control signal received by the charge pump conversion submodule from the control module 12 is the first control signal (for example, a high level 1), an equivalent circuit of the charging circuit may be illustrated as a circuit shown in FIG. 3. In a case that the control signal received by the charge pump conversion submodule from the control module 12 is the second control signal (for example, a low level 0), the equivalent circuit of the charging circuit may be illustrated as a circuit shown in FIG. 4.

Further, it is assumed that, an effective value of a current (i.e., charging currents of the first capacitor and the capacitor) flowing through the charging circuit in the first phase (i.e., a phase in which the received control signal from the control module 12 is the first control signal, that is, the former half T/2) is indicated by $I_c$, and an effective value of a current (i.e., discharging currents of the first capacitor and the capacitor) flowing through the charging circuit in the second phase (i.e., a phase in which the received control signal from the control module 12 is the second control signal, that is, the later half T/2) is indicated by $I_d$. It is assumed that an input current of the charging circuit is indicated by $I_{in}$, an output current of the charging circuit is indicated by $I_{out}$, power loss of the charging circuit in the first phase is indicated by $P_c$, and power loss of the charging circuit in the second phase is indicated by $P_d$. Total power loss of the charging circuit in the entire period (that is, a sum of the first phase and the second phase) is indicated by $P_t$. Further, since a duty ratio of each of the two phases of the charging circuit is always 50% (that is, each of the first phase and the second phase is half of the entire period), a relationship between the total power loss of the charging circuit and the power losses of the charging circuit in the two phases is expressed by the following formula (2):

$$P_t = \frac{1}{2}(P_c + P_d) \qquad (2)$$

Due to $P=I^2*R$, the power losses in the first phase and the second phase are respectively expressed by the following formulas (3) and (4):

$$P_c = I_c^2 * (R_{Q1} + R_{C1} + R_{Q3} + R_{C2}) \qquad (3)$$

$$P_d = I_d^2 * \frac{R_{C2} * (R_{Q2} + R_{C1} + R_{Q4})}{R_{C2} + R_{Q2} + R_{C1} + R_{Q4}} \qquad (4)$$

Based on the above two formulas, the total power loss of the charging circuit can be calculated from the following formula (5):

$$P_t = 0.5 * I_c^2 * (R_{Q1} + R_{C1} + R_{Q3} + R_{C2}) + \\ 0.5 * I_d^2 * \frac{R_{C2} * (R_{Q2} + R_{C1} + R_{Q4})}{R_{C2} + R_{Q2} + R_{C1} + R_{Q4}} \qquad (5)$$

In this way, the power loss of the charging circuit is calculated from the above formulas. Conduction resistance of a MOS transistor generally ranges from 2 mΩ to 20 mΩ, and ESR of a capacitive element having capacitance equal to and greater than 10 μF at low frequency bands (about 1 MHZ) generally ranges from 2 mΩ to 15 mΩ. If it is assumed in the embodiment of the present disclosure that, $R_{Q1}=R_{Q2}=R_{Q3}=R_{Q4}=15$ mΩ, and $R_{C1}=R_{C2}=10$ mΩ, the total power loss of the charging circuit according to the embodiment of the present disclosure may be calculated from the following formula (6):

$$P_t = 0.025 * I_c^2 + 0.004 * I_d^2 \qquad (6)$$

Further, it is assumed that $I_c=\sqrt{2}*I_{in}$, and $I_d=I_{out}$ (it should be noted that values of $I_c$ and $I_d$ may be obtained according to practical experience, which is not described in detail herein), the total power loss of the charging circuit may also be calculated from the following formula (7):

$$P_t \approx 0.0165 * I_{out}^2 \qquad (7)$$

In summary, the total power loss of the charging circuit according to the embodiment of the present disclosure may be determined by the output current of the charging circuit. For example, it is assumed that a charging circuit has an output of 4V/4 A (i.e., an output voltage of 4V and an output current of 4 A), the calculated total power loss of the charging circuit is 0.264 W. It should be noted that, since a conversion efficiency of a circuit is expressed by $$\eta = \frac{Pout}{Pin},$$

the conversion efficiency (which may be a step-down conversion efficiency herein) of the charging circuit is calculated as $$\frac{16}{16 + 0.264} = 98.4\%$$

(which is greater than 91%), which is not described in detail herein.

It can be seen from the above that, the step-down conversion efficiency of the charging circuit according to the embodiment of the present disclosure is generally equal to or greater than 98% (in a case that appropriate parameters are selected). In this way, compared with the conventional technology, the step-down conversion efficiency of the charging circuit is greatly improved, that is, energy loss of the charging circuit is reduced, so that the charging can be performed at a large current, the charging speed of the charging circuit can be effectively increased, and the charging time of the charging circuit can be reduced, thereby improving the charging efficiency of the charging circuit.

Further, since conduction resistance of a switching element is not equal to zero, a voltage drop occurs across the switching element in a case that the switching element is connected in series in a circuit, which results in the output voltage of the charging circuit being not equal to half of the input voltage of the charging circuit (that is, VOUT≠VIN/2).

In addition, since no inductance element (or resistance element) causing current loss exists in the charging circuit, the output current of the charging circuit is always maintained to be twice the input current of the charging circuit, that is, $I_{out}=2*I_{in}$. Therefore, the output voltage of the charging circuit may be determined based on the output current of the charging circuit, so as to determine the input voltage of the charging circuit.

For example, it is assumed that a charging voltage (i.e., a required output voltage of the charging circuit) of a battery in a terminal device is indicated by Vbat, a charging current (i.e., a required output current of the charging circuit) of the battery is indicated by Ibat, an input voltage of the charging circuit is indicated by Vc, an input current of the charging circuit is indicated by Ic, input power of the charging circuit is indicated by Pin, output power of the charging circuit is indicated by Pout, and step-down conversion efficiency of the charging circuit is indicated by $\eta$. In this case, an expression $Vc=2*Vbat/\eta$ is obtained based on expressions $Ic=Ibat/2$ (i.e., $Ibat=2*Ic$), $Pout=Pin*\eta$, $Pout=Vbat*Ibat$ and $Pin=Vc*Ic$. In this way, the input voltage (i.e., a relationship expression between the output voltage of the charging circuit and the input voltage of the charging circuit) of the charging circuit can be determined, which is not described in detail herein.

That is, during a process of charging the terminal device (such as a mobile phone or a tablet computer) by using the charging circuit according to the embodiment of the present disclosure, the charging voltage and the charging current of the battery in the terminal device may be firstly determined, and then an output voltage and an output current of an adapter for changing the terminal device may be determined based on the charging voltage and the charging current. For example, it is required an adapter having an output voltage of $Vc=2*Vbat/\eta$ and an output current of $Ic=Ibat/2$ to charge the terminal device, so as to ensure the security and the high efficiency of the charging circuit, which is not limited in the embodiment of the present disclosure.

In a case that the charge pump conversion module 14 in the charging circuit includes M (where M≥2) charge pump conversion submodules, since the charge pump conversion submodules are connected in parallel with each other, the equivalent resistance of the charge pump conversion module 14 can be further reduced, so that the charging circuit outputs a large current, that is, performs the charging at a large current, the charging speed of the charging circuit can be increased, and the charging time of the charging circuit can be reduced, thereby improving the charging efficiency of the charging circuit. In this case, if the charging voltage of the battery in the terminal device is still indicated by Vbat and the charging current of the battery in the terminal device is still indicated by Ibat, an input voltage of each of the charge pump conversion submodules in the charge pump conversion module 14 is determined as $Vc=2*Vbat/\eta$, and an input current of the charge pump conversion submodule is determined as $Ic=Ibat/(2*M)$, which are not described in detail herein.

It should be noted that the charging circuit according to the first embodiment of the present disclosure is applied in not only a scenario in which an adapter is used to charge a terminal device, but also a scenario in which a power bank is used to charge a terminal device. In the latter scenario, only the adapter is replaced with the power bank, which is not limited in the embodiment of the present disclosure.

A charging system is further provided according to the first embodiment of the present disclosure. The charging system may include the charging circuit described in the first embodiment of the present disclosure, which is not repeated herein.

There are provided the charging circuit and the charging system according to the first embodiment of the present disclosure. The charging circuit includes the charge pump conversion module including one or more charge pump conversion submodules connected in parallel with each other. For each of the charge pump conversion submodules, in the case that the charge pump conversion submodule receives the first control signal transmitted by the control module, the first set of switches is turned on and the second set of switches is turned off, so that the adaptation module charges the capacitors in the charge pump conversion submodule and the battery module connected with all of the charge pump conversion submodules. Further, in the case that the charge pump conversion submodule receives the second control signal transmitted by the control module, the second set of switches is turned on and the first set of switches is turned off, so that the capacitors in the charge pump conversion submodule charges the battery module. Compared with the conventional technology, charge and discharge elements used in the charging circuit according to the embodiment of the present disclosure are provided as capacitors rather than inductors, avoiding the problems such as the low step-down conversion efficiency, the small charging current and the large heating generation due to the inductors in the charging circuit. Furthermore, the charge pump conversion module has functions of stepping down a voltage and stepping up a current, so that a large current may be outputted in the case of a small input current. That is, the charging can be performed at a large current, so that the charging speed of the charging circuit can be effectively increased, and the charging time of the charging circuit can be reduced, thereby improving the charging efficiency of the charging circuit. In addition, it should be noted that, in practical applications, the charge pump converter circuit in the charging circuit may be built, and also may be implemented by an existing chip (where the chip may further include a control logic unit to control switching elements in the chip to be turned on or turned off). In the latter case, it is only required to connect corresponding elements to pins of the chip, which is not limited in the embodiment of the present disclosure.

Second Embodiment

Figure 5:
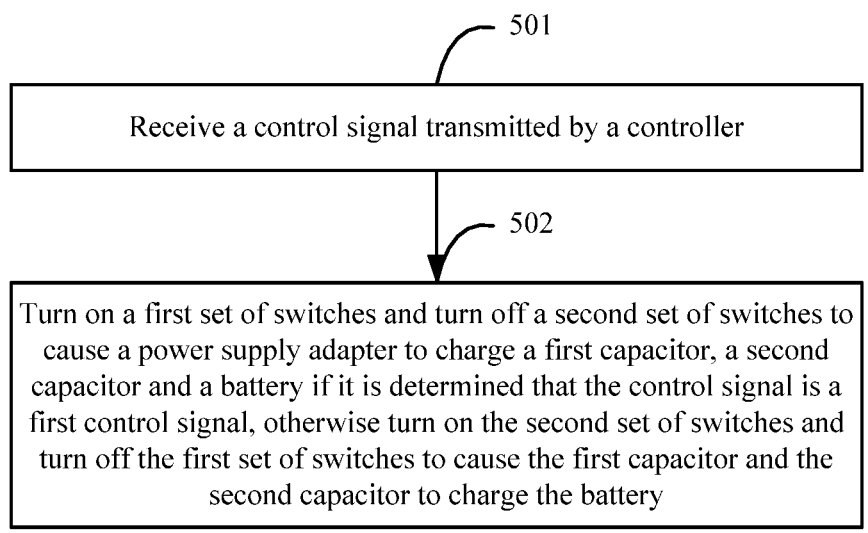
FIG. 5 is a schematic flowchart of a charging method according to a second embodiment of the present disclosure.

A charging method is provided according to a second embodiment of the present disclosure. Reference is made to FIG. 5, which is a schematic flowchart of the charging method according to the second embodiment of the present disclosure. A charging circuit used in this embodiment of the present disclosure is implemented by that according to the first embodiment of the present disclosure, which is not repeated herein. Specifically, as shown in FIG. 5, the charging method includes the following steps 501 to 502.

In step 501, a control signal transmitted by a controller is received.

In step 502, if it is determined that the control signal is a first control signal, a first set of switches is turned on and a second set of switches is turned off to cause a power supply adapter to charge a first capacitor, a second capacitor and a battery. If it is determined that the control signal is a second control signal, the second set of switches is turned on and the first set of switches is turned off to cause the first capacitor and the second capacitor to charge the battery.

The charging method according to the embodiment of the present disclosure may be applied to a charging circuit including one or more parallel branches, and each of the branches may include elements such as a first set of switches, a second set of switches, a first capacitor and a second capacitor. It should be noted that the charging method may be performed by a corresponding electronic device. The first set of switches may generally include a first switch (which may include one or more switching elements connected in parallel with each other) and a second switch (which may include one or more switching elements connected in parallel with each other). The second set of switches may generally include a third switch (which may include one or more elements connected in parallel with each other) and a fourth switch (which may include one or more elements connected in parallel with each other). In addition, each of the first switch, the second switch, the third switch and the fourth switch may be any one switching element having a switching function, such as a transistor (for example, a triode transistor or a field effect transistor), which is not limited in the embodiment of the present disclosure.

That is, in the embodiment of the present disclosure, when a control signal transmitted by a controller is received, it is firstly determined whether the control signal is a first control signal. If it is determined that the control signal is the first control signal, the first switch and the second switch in the electronic device are turned on, and a power supply adapter charges a first capacitor, a second capacitor and a battery in the electronic device. It should be noted that, in this case the battery is charged by the second capacitor. If it is determined that the control signal is not the first control signal, the third switch and the fourth switch in the electronic device are turned on, and the first capacitor and the second capacitor in the electronic device charge the battery. Compared with the conventional technology, charge and discharge elements used in the charging circuit according to the embodiment of the present disclosure are provided as capacitors rather than inductors, avoiding the problems such as the low step-down conversion efficiency, the small charging current and the large heating generation due to the inductors in the charging circuit. Furthermore, the charge pump conversion module has functions of stepping down a voltage and stepping up a current, so that a large current may be outputted in the case of a small input current. That is, the charging can be performed at a large current, so that the charging speed of the charging circuit can be effectively increased, and the charging time of the charging circuit can be reduced, thereby improving the charging efficiency of the charging circuit.

Further, the method may further include: performing current compensation on the first capacitor, the second capacitor and the battery by using a third capacitor connected in parallel with the power supply adapter in a case that the first set of switches is turned on and the second set of switches is turned off.

Optionally, each of the first capacitor, the second capacitor and the third capacitor may include one or more capacitive elements connected in parallel with each other, which is not repeated herein.

Further, the method may further include: acquiring power information of the battery in a real time manner and generating charging information based on the power information; and feeding back the charging information to the power supply adapter.

That is, in the charging method according to the embodiment of the present disclosure, the power information such as a charging percentage of the charged battery may be acquired in a real time manner, the charging information is generated based on the power information, and the charging information is fed back to the power supply adapter, so that the power supply adapter changes, based on the charging information, an output voltage and an output current in a real time manner, which is not described in detail in the embodiment of the present disclosure.

In addition, it should be noted that the charging method according to the second embodiment of the present disclosure is applied in not only a scenario in which an adapter is used to charge a terminal device, but also a scenario in which a power bank is used to charge a terminal device. In the latter scenario, only the adapter is replaced with the power bank, which is not limited in the embodiment of the present disclosure.

With the charging method according to the second embodiment of the present disclosure, when a control signal transmitted by a controller is received, it is firstly determined whether the control signal is a first control signal. If it is determined that the control signal is the first control signal, the first switch and the second switch in the electronic device are turned on, and a power supply adapter charges a first capacitor, a second capacitor and a battery in the electronic device. If it is determined that the control signal is not the first control signal, the third switch and the fourth switch in the electronic device are turned on, and the first capacitor and the second capacitor in the electronic device charge the battery. Compared with the conventional technology, charge and discharge elements used in the charging circuit according to the embodiment of the present disclosure are provided as capacitors rather than inductors, avoiding the problems such as the low step-down conversion efficiency, the small charging current and the large heating generation due to the inductors in the charging circuit. Furthermore, the charge pump conversion module has functions of stepping down a voltage and stepping up a current, so that a large current may be outputted in the case of a small input current. That is, the charging can be performed at a large current, so that the charging speed of the charging circuit can be effectively increased, and the charging time of the charging circuit can be reduced, thereby improving the charging efficiency of the charging circuit.

Third Embodiment

Figure 6:
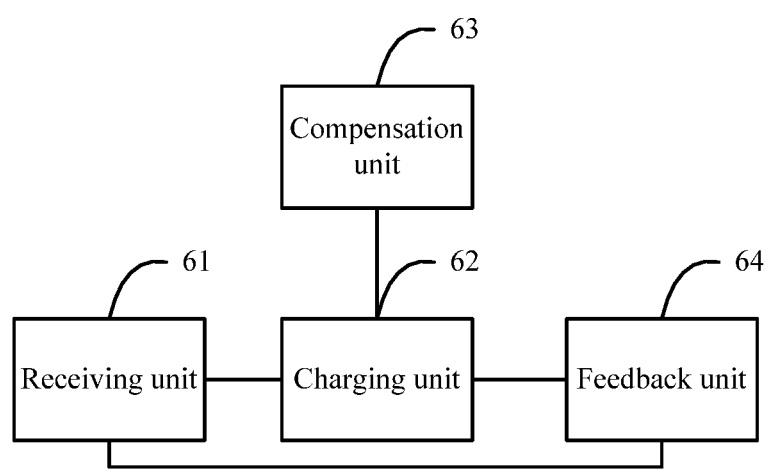
FIG. 6 is a schematic structural diagram of an electronic device according to a third embodiment of the present disclosure.

Based on the same inventive concept as the second embodiment of the present disclosure, an electronic device is provided according to a third embodiment of the present disclosure. Reference is made to FIG. 6, which is a schematic structural diagram of the electronic device according to the third embodiment of the present disclosure. Specifically, as shown in FIG. 6, the electronic device may include a receiving unit 61, and a charging unit 62.

The receiving unit 61 is configured to receive a control signal transmitted by a controller.

The charging unit 62 is configured to: turn on a first set of switches and turn off a second set of switches to cause a power supply adapter to charge a first capacitor, a second capacitor and a battery, if it is determined that the control signal is a first control signal; or turn on the second set of switches and turn off the first set of switches to cause the first capacitor and the second capacitor to charge the battery, if it is determined that the control signal is not the first control signal.

Further, the device may further include a compensation unit 63.

The compensation unit 63 is configured to: perform current compensation on the first capacitor, the second capacitor and the battery by using a third capacitor connected in parallel with the power supply adapter in a case that the first set of switches is turned on and the second set of switches is turned off.

Further, the device may further include a feedback unit 64.

The feedback unit 64 is configured to: acquire power information of the battery in a real time manner and generate charging information based on the power information; and feed back the charging information to the power supply adapter.

It should be noted that the electronic device according to the third embodiment of the present disclosure may be an independent device from the terminal device, or an integrated device integrated in the terminal device, which is not limited in the embodiment of the present disclosure.

In addition, it should be noted that the electronic device according to the third embodiment of the present disclosure is applied in not only a scenario in which an adapter is used to charge a terminal device, but also a scenario in which a power bank is used to charge a terminal device. In the latter scenario, only the adapter is replaced with the power bank, which is not limited in the embodiment of the present disclosure.

With the electronic device according to the second embodiment of the present disclosure, when a control signal transmitted by a controller is received, it is firstly determined whether the control signal is a first control signal. If it is determined that the control signal is the first control signal, the first switch and the second switch in the electronic device are turned on, and a power supply adapter charges a first capacitor, a second capacitor and a battery in the electronic device. If it is determined that the control signal is not the first control signal, the third switch and the fourth switch in the electronic device are turned on, and the first capacitor and the second capacitor in the electronic device charge the battery. Compared with the conventional technology, charge and discharge elements used in the charging circuit according to the embodiment of the present disclosure are provided as capacitors rather than inductors, avoiding the problems such as the low step-down conversion efficiency, the small charging current and the large heating generation due to the inductors in the charging circuit. Furthermore, the charge pump conversion module has functions of stepping down a voltage and stepping up a current, so that a large current may be outputted in the case of a small input current. That is, the charging can be performed at a large current, so that the charging speed of the charging circuit can be effectively increased, and the charging time of the charging circuit can be reduced, thereby improving the charging efficiency of the charging circuit.

It should be understood by those skilled in the art that the embodiments of the present disclosure may be implemented as methods, devices (apparatuses) or computer program products. Therefore, the present disclosure may be implemented by only hardware embodiments, only software embodiments or embodiments combining software with hardware. Alternatively, the present disclosure may be implemented as computer program products implemented on one or more computer available storage mediums (including but not limited to a magnetic disk memory, CD-ROM and an optical memory or the like) including computer available program codes.

The present disclosure is described with reference to flowcharts and/or block diagrams of the methods, devices (apparatuses) and computer program products according to the present disclosure. It should be understood that, each flow and/or block in the flowcharts and/or block diagrams and a combination of flows and/or blocks in the flowcharts and/or block diagrams may be implemented by computer program instructions. The computer program instructions may be provided to a general-purpose computer, a dedicated computer, an embedded processor or processors of other programmable data processing devices to generate a machine, such that the instructions executed by the computer or the processors of the other programmable data processing devices generate a device for implementing functions specified in one or more flows of the flowcharts and/or one or more blocks of the block diagrams.

The computer program instructions may also be stored in a computer readable memory which can guide the computer or other programmable data processing devices to operate in a certain manner, such that the instructions stored in the computer readable memory generate a product including an instruction device which implements functions specified in one or more flows of the flowcharts and/or one or more blocks of the block diagrams.

The computer program instructions may also be loaded to the computer or other programmable data processing devices, such that the computer or other programmable devices perform a series of operation steps to generate processing implemented by the computer, and thus the instructions executed on the computer or other programmable devices provide steps for implementing the functions specified in one or more flows of the flowcharts and/or one or more blocks of the block diagrams.

Although the preferred embodiments of the present disclosure are described, those skilled in the art may make additional changes and modifications to the embodiments once they know the basic creative concepts. Therefore, the appended claims are intended to be explained as including the preferred embodiments and all changes and modifications falling within the scope of the present disclosure.

Apparently, those skilled in the art may make various changes and variations to the present disclosure without departing from the spirit and scope of the present disclosure. In this case, if the changes and variations of the present disclosure fall within the scope of the claims of the present disclosure and equivalent technologies thereof, the present disclosure is intended to include the changes and variations.

The invention claimed is:

1. A charging circuit, comprising:
a control module; and
a charge pump conversion module connected to the control module, wherein
an input end of the charge pump conversion module is connected to an adaptation module, and an output end of the charge pump conversion module is connected to a battery module;
the charge pump conversion module comprises one or more charge pump conversion submodules connected in parallel with each other; and
for each of the charge pump conversion submodules in the charge pump conversion module, the charge pump conversion submodule is configured to: turn on a first set of switches in the charge pump conversion submodule and turn off a second set of switches in the charge pump conversion submodule to cause the adaptation module to charge the battery module and capacitors in the charge pump conversion submodule, in a case that the charge pump conversion submodule receives a first control signal transmitted by the control module; or turn off the first set of switches in the charge pump conversion submodule and turn on the second set of switches in the charge pump conversion submodule to cause the capacitors in the charge pump conversion submodule to charge the battery module, in a case that the charge pump conversion submodule receives a second control signal transmitted by the control module,
wherein for each of the charge pump conversion submodules in the charge pump conversion module, a relationship between an input voltage of the charge pump conversion submodule, an input current of the charge pump conversion submodule, a charging voltage required by the battery module and a charging current required by the battery module is expressed by a first formula:

$$\begin{cases} Vc = 2*Vbat/\eta \\ Ic = Ibat/(2*M) \end{cases}$$

wherein Vc represents the input voltage of the charge pump conversion submodule, Ic represents the input current of the charge pump conversion submodule, Vbat represents the charging voltage required by the battery module, Ibat represents the charging current required by the battery module, η represents a step-down conversion efficiency of the charging circuit, and M is a positive integer and represents the number of the charge pump conversion submodules in the charge pump conversion module.

2. The charging circuit according to claim 1, wherein the first set of switches comprises a first switch and a second switch, the second set of switches comprises a third switch and a fourth switch, and the capacitors comprise a first capacitor and a second capacitor, wherein
a control terminal of the first switch is connected to an output end of the control module, an input terminal of the first switch is connected to a first terminal of the adaptation module, and an output terminal of the first switch is connected to an input terminal of the third switch and a first terminal of the first capacitor;
a control terminal of the second switch is connected to the output end of the control module, an input terminal of the second switch is connected to a second terminal of the first capacitor and an input terminal of the fourth switch, and an output terminal of the second switch is connected to a first terminal of the second capacitor, a first terminal of the battery module, and an output terminal of the third switch;
a control terminal of the third switch is connected to the output end of the control module; and
a control terminal of the fourth switch is connected to the output end of the control module, and an output terminal of the fourth switch is connected to a second terminal of the second capacitor, a second terminal of the adaptation module, and a second terminal of the battery module and serves as a common negative terminal.

3. The charging circuit according to claim 2, wherein each of the first switch, the second switch, the third switch and the fourth switch at least comprises one or more switching elements connected in parallel with each other.

4. The charging circuit according to claim 3, wherein each of the one or more switching elements connected in parallel with each other is a transistor.

5. The charging circuit according to claim 2, wherein each of the first capacitor and the second capacitor at least comprises one or more capacitive elements connected in parallel with each other.

6. The charging circuit according to claim 2, further comprising:
a compensation module connected to the adaptation module and the charge pump conversion module, wherein the compensation module is configured to: perform, for each of the charge pump conversion submodules, current compensation on the battery module and the capacitors in the charge pump conversion submodule in a case that the first set of switches in the charge pump conversion submodule is turned on and the second set of switches in the charge pump conversion submodule is turned off.

7. The charging circuit according to claim 6, wherein the compensation module comprises a third capacitor, wherein
a first terminal of the third capacitor is connected to the first terminal of the adaptation module and the input terminal of the first switch; and
a second terminal of the third capacitor is connected to the second terminal of the second capacitor, the second terminal of the battery module, the second terminal of the adaptation module, and the output terminal of the fourth switch.

8. The charging circuit according to claim 1, further comprising:
a feedback unit connected between the battery module and the adaptation module, wherein the feedback unit is configured to:
acquire power information of the battery module in a real time manner, and generate charging information based on the power information; and
feed back the charging information to the adaptation module, wherein the adaptation module changes, based on the charging information, a voltage and a current outputted to the charge pump conversion module in a real time manner.

9. A charging method, comprising:
receiving a control signal transmitted by a controller; and
turning on a first set of switches in a charge pump conversion submodule and turning off a second set of switches in the charge pump conversion submodule to cause a power supply adapter to charge a first capacitor and a second capacitor in the charge pump conversion submodule and a battery connected to the charge pump conversion submodule, if it is determined that the control signal is a first control signal; or turning on the second set of switches in the charge pump conversion submodule and turning off the first set of switches in the charge pump conversion submodule to cause the first capacitor and the second capacitor to charge the battery, if it is determined that the control signal is a second control signal, wherein
the charge pump conversion submodule is a charge pump conversion submodule in a charge pump conversion module, and the charge pump conversion module comprises one or more charge pump conversion submodules connected in parallel with each other,
wherein for each of the charge pump conversion submodules in the charge pump conversion module, a relationship between an input voltage of the charge pump conversion submodule, an input current of the charge pump conversion submodule, a charging voltage required by the battery module and a charging current required by the battery module is expressed by a first formula:

$$\begin{cases} Vc = 2*Vbat/\eta \\ Ic = Ibat/(2*M) \end{cases}$$

wherein Vc represents the input voltage of the charge pump conversion submodule, Ic represents the input current of the charge pump conversion submodule, Vbat represents the charging voltage required by the battery module, Ibat represents the charging current required by the battery module, η represents a step-down conversion efficiency of the charging circuit, and M is a positive integer and represents the number of the charge pump conversion submodules in the charge pump conversion module.

10. The method according to claim 9, further comprising:
performing current compensation on the first capacitor, the second capacitor and the battery by using a third capacitor connected in parallel with the power supply adapter in a case that the first set of switches is turned on and the second set of switches is turned off.

11. The method according to claim 9, further comprising:
determining a charging voltage and a charging current of the battery; and
determining, based on the charging voltage and the charging current of the battery, an output voltage and an output current outputted by the power supply adapter to the charge pump conversion module.

12. The method according to claim 9, further comprising:
acquiring power information of the battery in a real time manner and generating charging information based on the power information; and
feeding back the charging information to the power supply adapter, and changing, by the power supply adapter based on the charging information, a voltage and a current outputted to the charge pump conversion module in a real time manner.

13. An electronic device, comprising:
a receiving unit configured to receive a control signal transmitted by a controller to a charge pump conversion submodule in a charge pump conversion module; and
a charging unit configured to: turn on a first set of switches in the charge pump conversion submodule and turn off a second set of switches in the charge pump conversion submodule to cause a power supply adapter to charge a first capacitor and a second capacitor in the charge pump conversion submodule and a battery connected to the charge pump conversion submodule, if it is determined that the control signal is a first control signal; or turn on the second set of switches in the charge pump conversion submodule and turn off the first set of switches in the charge pump conversion submodule to cause the first capacitor and the second capacitor to charge the battery, if it is determined that the control signal is a second control signal, wherein
the charge pump conversion module comprises one or more charge pump conversion submodules connected in parallel with each other,
wherein for each of the charge pump conversion submodules in the charge pump conversion module, a relationship between an input voltage of the charge pump conversion submodule, an input current of the charge pump conversion submodule, a charging voltage required by the battery module and a charging current required by the battery module is expressed by a first formula:

$$\begin{cases} Vc = 2 * Vbat/\eta \\ Ic = Ibat/(2 * M) \end{cases}$$

wherein Vc represents the input voltage of the charge pump conversion submodule, Ic represents the input current of the charge pump conversion submodule, Vbat represents the charging voltage required by the battery module, Ibat represents the charging current required by the battery module, η represents a step-down conversion efficiency of the charging circuit, and M is a positive integer and represents the number of the charge pump conversion submodules in the charge pump conversion module.

14. The device according to claim 13, further comprising:
a compensation unit configured to: perform current compensation on the first capacitor, the second capacitor and the battery by using a third capacitor connected in parallel with the power supply adapter in a case that the first set of switches is turned on and the second set of switches is turned off.

15. The device according to claim 13, further comprising:
a feedback unit configured to: acquire power information of the battery in a real time manner and generate charging information based on the power information; and feed back the charging information to the power supply adapter, wherein the power supply adapter changes, based on the charging information, a voltage and a current outputted to the charge pump conversion module in a real time manner.

* * * * *